(12) United States Patent
Donatiello et al.

(10) Patent No.: US 8,495,306 B2
(45) Date of Patent: Jul. 23, 2013

(54) METHOD FOR EXECUTING DATA UPDATES IN AN IC CARD

(75) Inventors: Saverio Donatiello, Mercogliano (IT); Corrado Guidobaldi, Naples (IT); Mariangela Rauccio, Portico di Caserta (IT)

(73) Assignee: STMicroelectronics International N.V., Geneva (CH)

( * ) Notice: Subject to any disclaimer, the term of this patent is extended or adjusted under 35 U.S.C. 154(b) by 435 days.

(21) Appl. No.: 12/915,668

(22) Filed: Oct. 29, 2010

(65) Prior Publication Data

US 2011/0107041 A1 May 5, 2011

(30) Foreign Application Priority Data

Oct. 29, 2009 (IT) .................................. MI09A1886

(51) Int. Cl.
*G06F 12/00* (2006.01)
(52) U.S. Cl.
USPC ....................................................... 711/136
(58) Field of Classification Search
None
See application file for complete search history.

(56) References Cited

U.S. PATENT DOCUMENTS

| 2006/0058024 A1* | 3/2006 | Manner et al. ............. 455/432.3 |
| 2007/0147168 A1 | 6/2007 | Pinto et al. ..................... 365/236 |
| 2009/0037646 A1 | 2/2009 | Molotchko et al. ........... 711/103 |
| 2010/0214958 A1* | 8/2010 | Wijayanathan et al. ...... 370/255 |

FOREIGN PATENT DOCUMENTS

| WO | 2004/040586 | 5/2004 |
| WO | 2008/150927 | 12/2008 |
| WO | 2009/067476 | 5/2009 |

OTHER PUBLICATIONS

Jansen et al., "Overcoming impediments to cell phone forensics" Hawaii International Conference on Systems Sciences, IEEE, Jan. 2008, pp. 1-9.
Schooner Information Tech., "System including a fine-grained memory and a less-fine-grained memory", PCT/US2008/065167, Dec. 2008, pp. 1-156.

* cited by examiner

*Primary Examiner* — Brian Peugh
(74) *Attorney, Agent, or Firm* — Allen, Dyer, Doppelt, Milbrath & Gilchrist, P.A.

(57) ABSTRACT

A method is for executing n data updates in an IC Card which has memory pages supporting m erase operations per page, with m<n. The method includes the step of allocating a cyclic elementary file including N records, each record associated to a memory page of the IC Card, and the cyclic elementary file indexing a less recently updated record which is erased before writing data to be updated.

24 Claims, 4 Drawing Sheets w = 4 updates per memory page    r = size of L

METHOD FOR EXECUTING DATA UPDATES IN AN IC CARD

FIELD OF THE INVENTION

The present invention relates to a method for executing data updates in an IC Card which comprises memory pages supporting m erase operations per page. More particularly, the present invention relates to a method of the type described above wherein a data update in a memory page comprises a step of erasing data therein previously stored.

The present invention further relates to an IC Card including memory pages which support m erase operations and means or circuitry for executing data updates in the memory pages.

BACKGROUND OF THE INVENTION

A known method for executing data updates in an IC Card comprises a step of writing data to be updated in a file of the IC Card, i.e. a logic structure corresponding to one or more memory pages of an EEPROM of the IC Card. More particularly, data are physically stored as a sequence of bits in the memory pages of the EEPROM.

When a memory page already storing a sequence of bits is updated, it should be previously erased and set to a predetermined sequence of 0000 . . . 00 or FFFF . . . FF values. A number of erase operations, and thus also a corresponding number of data update supported by each memory page, is limited by the physical characteristics of the EEPROM, for example to $m=5*10^5$ erase operations.

However, some IC Card applications may require several updates of data which rapidly exceeds the number of erasing operations supported by the memory pages of the IC Card. This is the case of an authentication counter for a GSM application, which is incremented each time a GSM Network authenticates the IC Card, or the case of a transaction application, wherein a money counter is updated after each card payment. There is also the case of a so called LOCI update application, wherein information regarding a GSM cell connected by a mobile phone is updated in a LOCI file of the IC Card each time the GSM cell whereto the mobile phone is connected changes. In this case, when the number of erase operations exceeds the memory pages capability to be erased, the IC Card is damaged, data is lost, and the corresponding IC Card application is unusable.

SUMMARY OF THE INVENTION

The aim at the base of the present invention is that of providing a method for executing n data updates in an IC Card whose memory pages support less than n erase operations, in order to extend the life time of the IC Card and to manage IC Card applications requiring several updates of certain data, overcoming the limitations and drawbacks that currently affects the prior art methods. This may be accomplished by allocating a cyclic elementary file of an IC Card, comprising N records, each associated to a respective memory page of the IC Card, and executing subsequent erase/write operations in a different record of the cyclic elementary file. Advantageously, each N subsequent erase/writing operation involves executing each record of the cyclic elementary file and N data updates once, before erasing data previously stored in a same record of the cyclic elementary file, i.e. the corresponding memory page.

More particularly, if the number of erase operations supported by the memory pages of the IC Card is m and the cyclic elementary file includes N records, the number of erase/writing operations supported by the cyclic elementary file, is $N*m$. Thus, the cyclic elementary file may support IC applications requiring several updates, which rapidly exceeds the capability of each memory page.

According to an aspect, a plurality of records N of the cyclic elementary file may be associated to a first memory page, and N subsequent data updates may be executed in the plurality of records N, without executing an erase operation on a memory page. When the first memory page has been written, a second memory page, associated to a second plurality of records N of the cyclic elementary file, may be written, in order to execute further N data updates, without erasing memory pages. When a last memory page associated to a corresponding plurality of N records of the cyclic elementary file has been written, the first memory page is erased.

Advantageously, according to this aspect, if N records are associated to each memory page and Pk memory pages are associated to the cyclic elementary file, $N*Pk*m$ erase operations are supported. According to this idea, a method is for executing n data updates in an IC Card which comprises memory pages supporting only m erase operations per page, with m<n. The method includes the step of allocating a cyclic elementary file including N records, each associated to a memory page of the IC Card, the cyclic elementary file indexing a less recently updated record which is erased before writing data to be updated.

A number N of records of the cyclic elementary file is greater or equal to n/m, where n is a number of data updates to be supported by the IC Card and m a number of erase operations supported by the respective memory pages. After each step of writing data in an indexed record, the cyclic elementary file updates the index to the less recently updated record, which cyclically points to the record following the previously indexed one.

According to an embodiment, the records of the cyclic elementary file store a counter which is increased at each step of writing and the indexing of the less recently updated record is implemented reading the lower value of the counter among the records. This embodiment is particularly advantageous for IC Card applications requiring a counter which is always incremented or always decremented, for example for an authentication counter application, wherein a total number of log-in attempts during the life cycle of the IC Card is stored.

According to another embodiment, the records of the cyclic elementary file comprise a counter c1 which is increased or decreased at each step of writing. This is advantageous when the IC Card application uses a counter which is frequently updated but which may be increased or decreased.

In this case, the cyclic elementary file implements the indexing of the less recently updated record with a second counter which is stored in each record and is increased in each step of writing, and detecting the less recently updated record as the record storing the lower value of the second counter.

According to another embodiment, the cyclic elementary file indexes the less recently updated record associating a status byte to each record. The status byte is a first value, if the record is unused, a second value, if the record is the latest updated, or a third value, otherwise. According to this embodiment, the latest updated record is detected and the following record is indexed as the less recently updated record.

According to another aspect, a pointer to a current record to be updated is stored and a next function provided by the cyclic elementary file is used to detect a record following the current record, after the step of writing data to be updated.

According to another aspect, data to be updated by a predetermined number N of subsequent steps of writing are stored in a corresponding plurality of records N of the cyclic elementary file, which are stored in a same memory page of the IC Card, each page having predetermined size at least equal to N*r, wherein r is a size of the each record.

According to another aspect, an IC Card comprises memory pages supporting m erase operations per page, with m<n, including a cyclic elementary file comprising N records. Each record is associated to a memory page of the IC Card, and the cyclic elementary file indexes less recently updated record which is erased before writing data to be updated.

Further features and advantages of the present invention will be apparent from the description and the figures give here below only for exemplificative purpose and without limiting the scope of protection of the present invention.

DETAILED DESCRIPTION OF THE PREFERRED EMBODIMENTS

Figure 1:
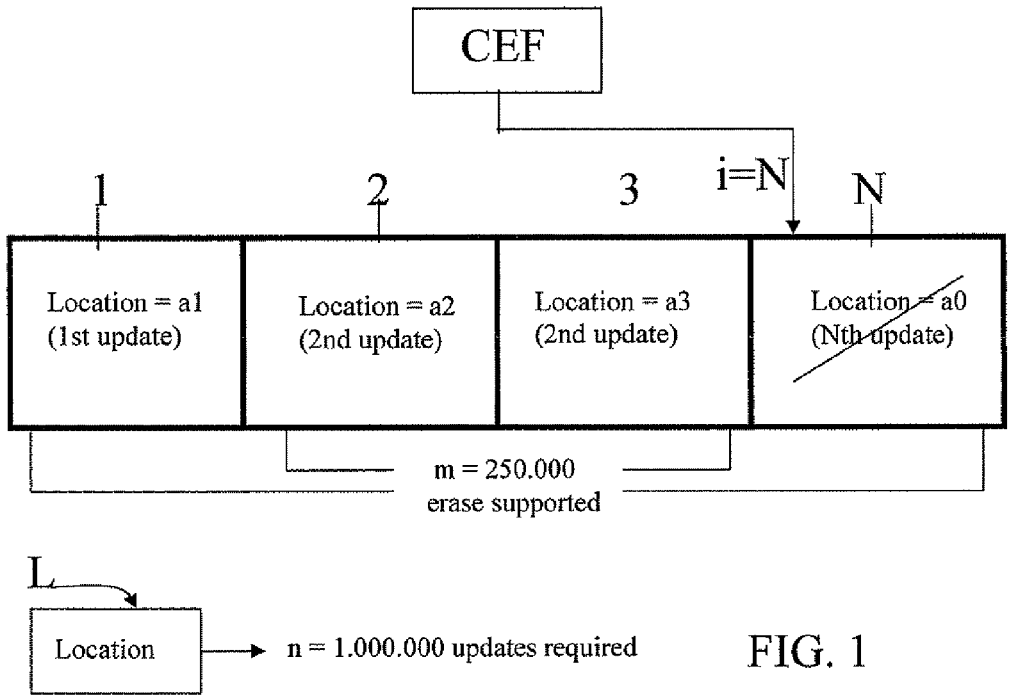
FIG. 1 schematically represents a phase of the method for executing at least n data updates in N records of a cyclic elementary file, according to the present invention.
Figure 2:
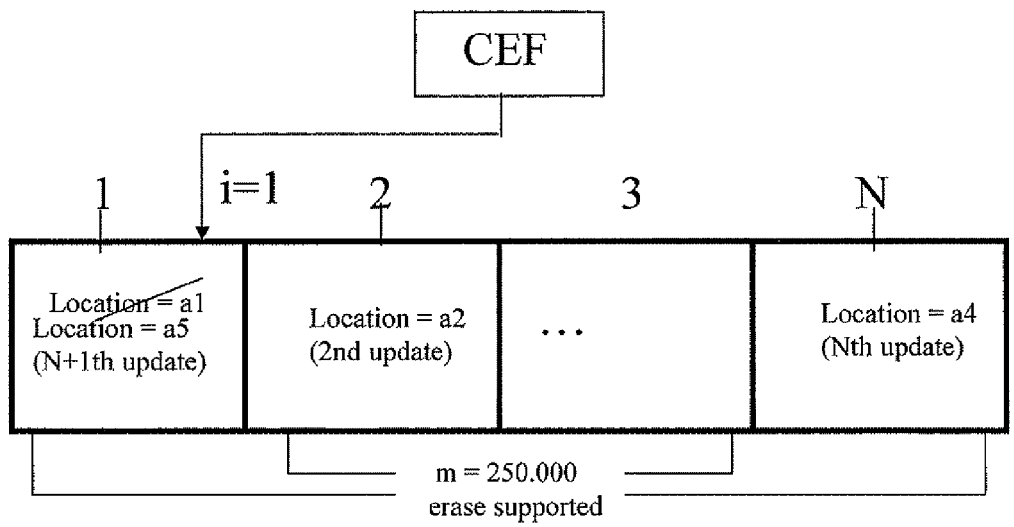
FIG. 2 schematically represents another phase of the method for executing at least n data updates, according to the present invention.

With reference to FIGS. 1 and 2, the main steps of the method for executing n data updates in an IC Card according to the present invention are schematically represented, the IC Card comprising an EEPROM with memory pages which support m erase operations per page, with m<n.

Data to be updated L are physically stored as a sequence of bits in the memory pages of the EEPROM. More particularly, when a memory page already storing a sequence of bits is updated, it is previously erased and set to a predetermined sequence of 0000 . . . 00 or FFFF . . . FF values.

For example, with reference to FIG. 1 and without limiting the scope of protection of the present invention, the memory pages support m=250.000 erase operations, after which the memory pages capability to be erased is not guaranteed.

For instance, data to be updated L are associated to a LOCI update application, wherein an information regarding a GSM cell connected by a mobile phone is updated in a LOCI file of the IC Card, each time the GSM cell whereto the mobile phone is connected changes. The LOCI update application uses several updates of the LOCI file which may rapidly exceed 250.000 updates, i.e. the number of erasing/writing operations supported by each IC Card memory pages.

According to the present invention, the method comprises a step of allocating a cyclic elementary file CEF including N records 1 . . . N, each record being associated to a memory page of the IC Card, wherein the cyclic elementary file CEF indexes a less recently updated record i which is erased before writing data to be updated L. For example, records 1, 2, 3, N of FIG. 1 store corresponding locations information a1, a2, a3, a0 and the cyclic elementary file CEF indexes record N as the less recently updated record i, since a0 is the oldest information regarding a GSM cell connected by the mobile phone.

Thus, when the location of the mobile phone changes and another GSM cell is thereto connected, the cyclic elementary file points to record N as the less recently updated file so that the corresponding data a0 is erased and the information regarding the actual GSM cell connected is therein written, i.e. the value a4.

When the last record N of the sequence 1 . . . N of FIG. 1 is written, the following record is considered to be the first record of the sequence, i.e. the record 1. This case is schematically represented in FIG. 2, wherein the record 1 storing value a1 is indexed as the less recently updated record and is erased to store another location information, i.e. value a5.

Figure 6:
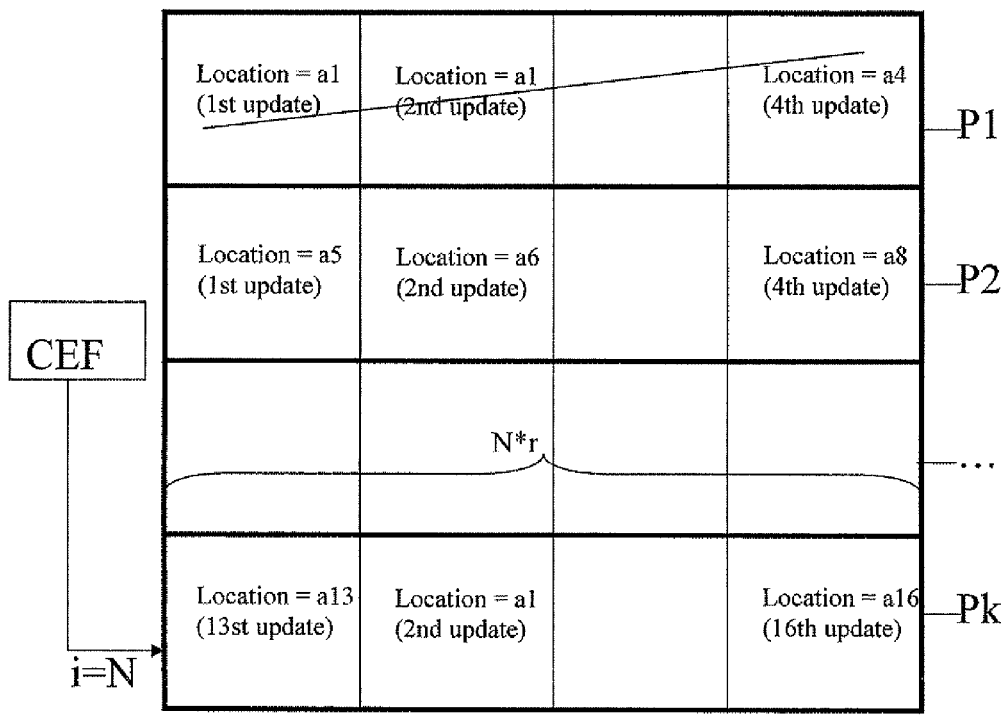
FIG. 6 schematically represents a phase of the method for executing at least n data updates on N records of the cyclic elementary file, wherein N data updates are written in a same memory page, according to the present invention.
Figure 6:
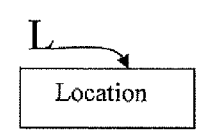
Figure 7:
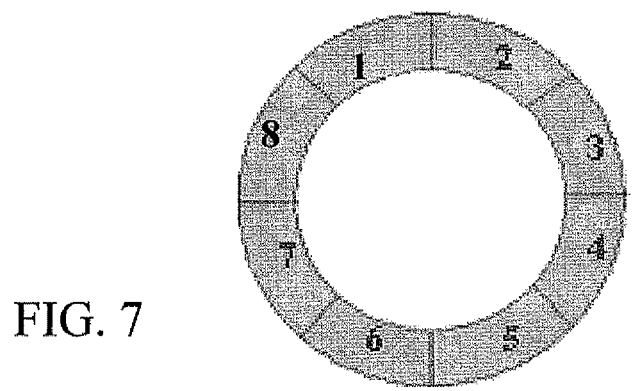
FIG. 7 schematically represents a cyclic elementary file for implementing the method, according to the present invention.

More particularly, the cyclic elementary file of FIG. 1 is logically represented also in FIG. 6, wherein eight records 1 . . . 8 are circularly connected so that record 8 follows record 1. A number N of records of the cyclic elementary file CEF is greater or equal to n/m, where n is a number of data updates to be supported by the IC Card and m a number of erase operations supported by the respective memory pages. With reference to FIG. 1, if each memory pages support 250,000 erase operations and the cyclic elementary CEF file comprises N=4 records, n=1,000,000 data update may be supported.

More particularly, after each step of writing data to be updated in a record 1 . . . N, the cyclic elementary file CEF updates an index to the less recently updated record according to the formula i=i+1 mod N, wherein i is the index of the record wherein the last writing has been executed and N the number of records. In this way, the cyclic elementary file CEF cyclically points to a following record with respect to the record wherein data to be updated has been written.

According to an aspect of the present invention, the records 1 . . . N store a counter c which is increased after each step of writing. This is advantageous for IC Card applications using the storage of incremental counter, for example an authentication application counting the number of log-in executed along the IC Card life cycle.

Figure 3:
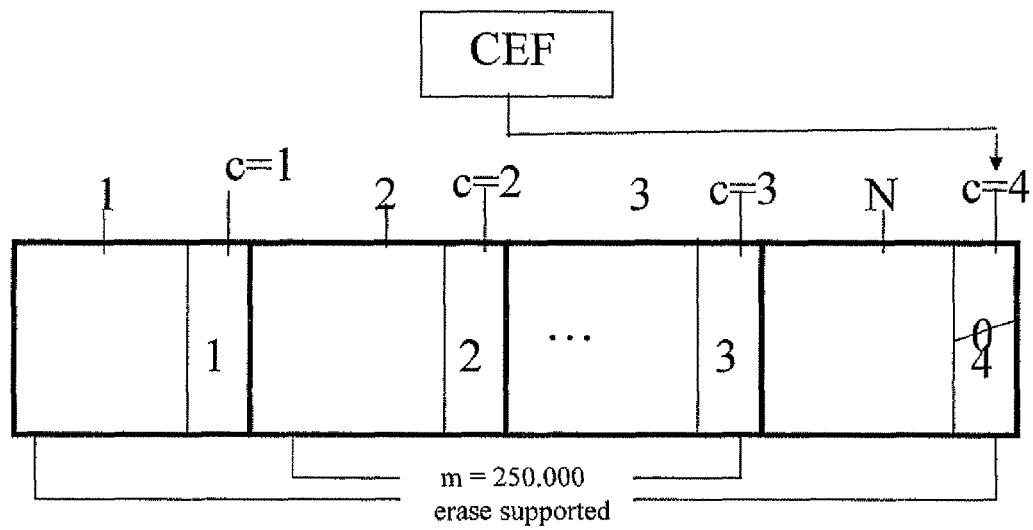
FIG. 3 schematically represents the method for executing at least n data updates, according to an embodiment of the present invention, wherein a counter c is used to retrieve the last updated record.

More particularly, according to this aspect of the present invention, the cyclic elementary file CEF implements the indexing of the less recently updated memory page i reading the lower value of the counter c in the records 1 . . . N For example, with reference to FIG. 3, the cyclic elementary file CEF points to record N which stores the counter 0, corresponding to less recently updated records and updates its counter to the value 4, which is calculated incrementing the value 3 of the counter c previously stored in the record 3.

According to another aspect, the records 1 . . . N comprise a counter c1 which is increased or decreased at each step of writing. This is advantageous for IC Card applications requiring the storage of counter which may be increased or decreased, for example a money counter application, counting the credit available in a credit card.

Figure 4:
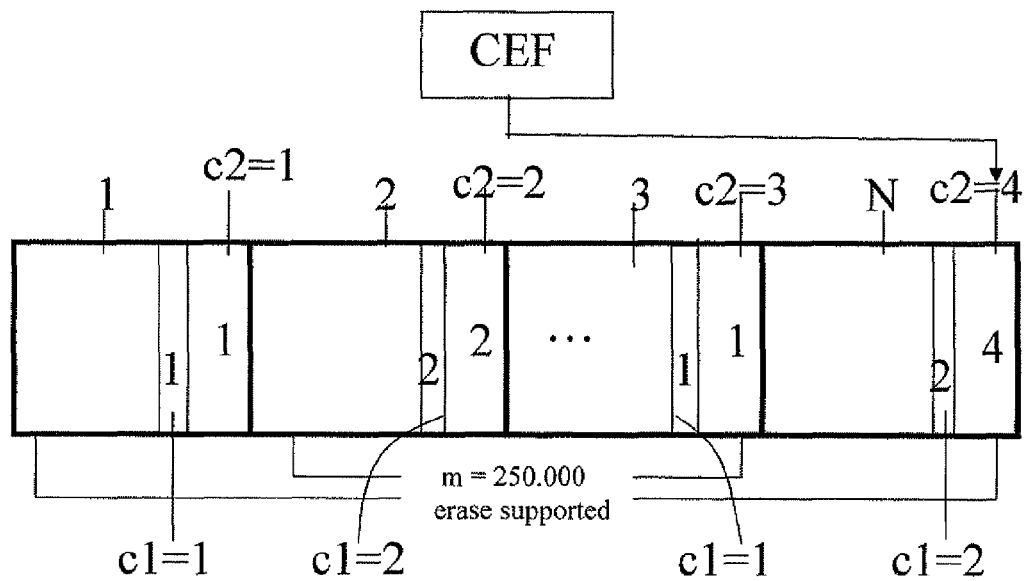
FIG. 4 schematically represents the method for executing at least n data updates, according to another embodiment of the present invention, wherein a first counter c is incremented or decremented and a second counter is used to retrieve the last updated memory page.
Figure 5:
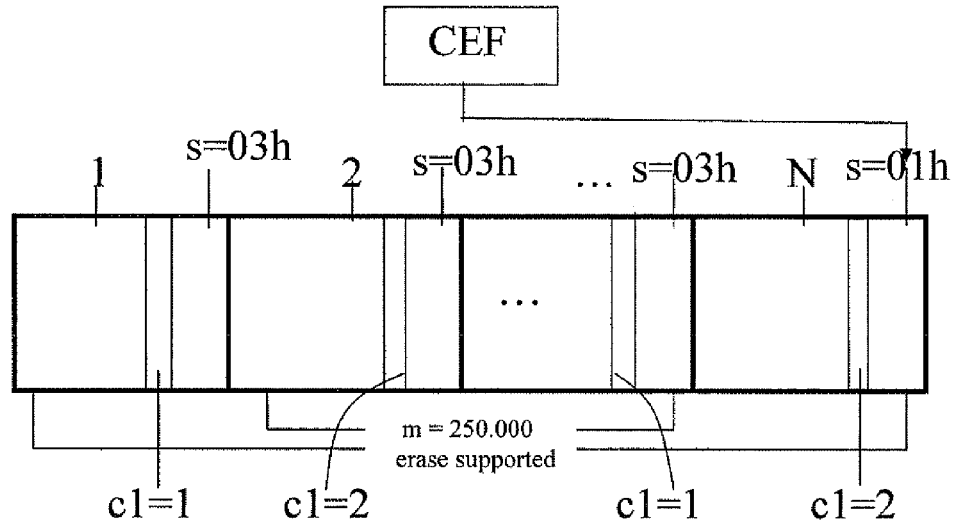
FIG. 5 schematically represents the method for executing at least n data updates, according to an embodiment of the present invention, wherein a status byte is used to retrieve the last updated record.

As represented in FIG. 4, according to this aspect, the cyclic elementary file CEF implements the indexing of the less recently updated memory page storing a second counter $c_2$ in the records 1 . . . N and incrementing the counter at each step of writing. The less recently updated record corresponds to the record storing the lower value of the second counter $c_2$.

For example, a first data update is executed on record 1 wherein the corresponding counter $c_2$ is set to value 1 and the counter $c_1$ is set to value 1; a second data update is executed on record 2, the corresponding counter $c_2$ incremented to 2 and the counter $c_1$ is incremented to value 2; a third data update is executed on record 3, incrementing counter $c_2$ to value 3 and decrementing counter $c_1$ to value 1.

According to a preferred embodiment, the counter $c_1$ and $c_2$ comprises a header including a status byte, storing information which describe the type of the counter, for example if the counter may be only increased, only decreased, increased and decreased, a step associated to each increment or decrement, as schematically reported in the table below.

| Counter Status byte | | | | | | | | |
|---|---|---|---|---|---|---|---|---|
| Bit Number | | | | | | | | |
| 7 | 6 | 5 | 4 | 3 | 2 | 1 | 0 | Description |
| — | — | — | — | — | — | 0 | 1 | Increase counter file |
| — | — | — | — | — | — | 1 | 0 | Decrease counter file |
| — | — | — | — | — | — | 1 | 1 | Increase/Decrease counter file |
| — | — | — | — | — | — | 0 | 0 | RFU |
| — | — | — | — | — | 1 | — | — | Counter already initialized |
| — | — | — | — | — | 0 | — | — | Counter not initialized |
| — | 0 | 0 | 0 | 0 | — | — | — | Counter file with no fixed increment/decrement amount |
| — | x | x | x | x | — | — | — | Counter file with fixed increment/decrement amount. Amount in the range 01h . . . 0Fh. bit3 = 20, bit4 = 21, bit5 = 22, bit6 = 23, |
| 0 | — | — | — | — | — | — | — | No hidden counter file associated |
| 1 | — | — | — | — | — | — | — | Hidden counter file associated |

According to another aspect, the cyclic elementary file CEF implements the indexing of the less recently updated record i associating a status byte s to each of the records 1 . . . N. The status byte is set to a first value 00h, if the record 1 . . . N is unused, to a second value 01h, if the record 1 . . . N is the latest updated record, or to a third value 03h, otherwise. In other words, after N data updated, no records are associated to a value 00h, one single record is associated to 01h and all the other records to 03h.

The method detects the record 1 . . . N associated to the status byte having the value 01h, associated to the latest updated memory page, indexes the following record in the cyclic elementary file CEF as the less recently updated memory page i, and reset the previous record to 03h. If more than one record are associated to status 01h, for example because a failure occurs after the setting of the status byte of the less recently updated record to value 01h and before the setting of the status byte of the previous record to value 03h, the method provides to discard the content of the less recently updated record.

A further step is provided to store in a backup buffer data to be updated in a record 1 . . . N, and a step of retrieving data from the backup buffer, for example if a fault occurs after the erase operation of data stored in the record and before the following writing operation of data to be updated.

Figure 8:
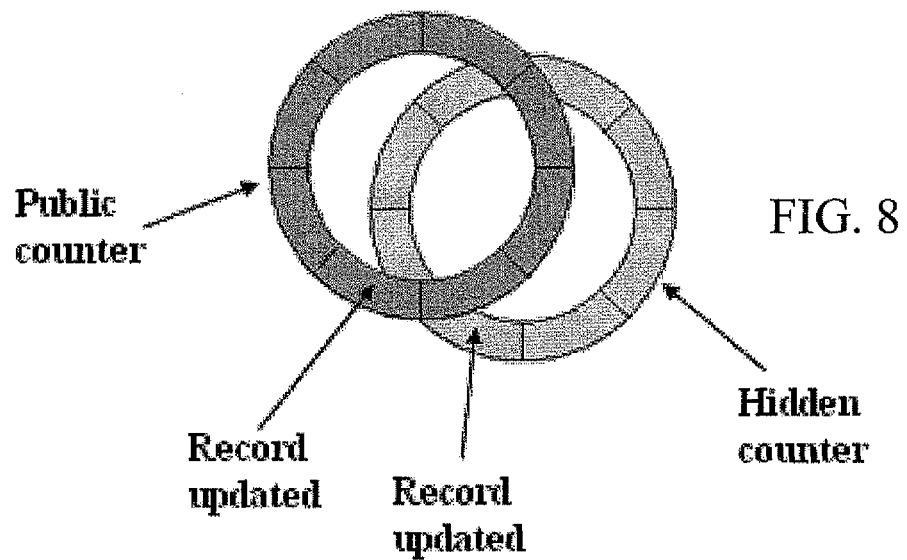
FIG. 8 schematically represents the cyclic elementary file of FIG. 7 and a backup cyclic elementary file, according to the present invention.

More particularly, a duplicate CEF1 of the cyclic elementary file CEF and the corresponding records N is created, as schematically represented in FIG. 8. When the cyclic elementary file CEF is initialized or updated, the same operations are executed on the duplicated cyclic elementary file CEF1. More particularly, the cyclic elementary file CEF and the duplicated cyclic elementary file CEF1 stores corresponding counters.

After an initialization or update operation, the cyclic elementary file CEF and the duplicated cyclic elementary file CEF1, i.e. the corresponding counters, are compared. If they differ, the data update is considered to be failed and the previously values are recovered.

According to a preferred embodiment, N data to be updated by a corresponding number N of subsequent steps of writing are stored in a plurality of records 1 . . . N which are associated to a same memory page P1 of the IC Card, having a predetermined size at least equal to N*r, wherein r is a size of the data to be updated. This embodiment is schematically represented in FIG. 6, wherein P1, Pk memory pages, each having a capability to be erased m times and being associated to N records of the cyclic elementary file CEF. The cyclic elementary file CEF comprises N*k records, where k is the number of memory pages associated by the cyclic elementary file CEF.

A plurality of records N of the cyclic elementary file are associated to the first memory page P1, and N subsequent data updates may be executed in the plurality of records N, without erasing the first memory page P1 or other memory pages P2-Pk. For example, the location information a1-a4 are written inside the four records of memory page P1.

When the first memory page P1 has been completely written, a second memory page P2, associated to a second plurality of records N of the cyclic elementary file CEF, may be written, in order to execute further N data updates without erasing the first 21 and the second 22 memory pages, or other memory pages P3-Pk. The writing of records inside the respective memory pages continues without erasing operation until all the memory pages are written.

When a last memory page Pk associated to a corresponding plurality of N records of the cyclic elementary file CEF has been written, the first memory page 21 is erased in order to be available for the following N updates of data. Advantageously, if N records are associated to each memory page and Pk memory pages are associated to the cyclic elementary file, N*Pk*m erase operations are supported.

According to this embodiment, the cyclic elementary file CEF includes N*k records and each memory page 21, Pk comprises N records. More particularly, the cyclic elementary file CEF indexes a less recently updated record i which is erased before writing data to be updated L, together with the content of the N−1 records included in the same memory page.

The method further provides an application, installed in a device external to the IC Card, for managing the counter stored inside the record of the cyclic elementary file of the IC Card. This application implements an API comprising the functions reported in the table below.

The device external to the IC Card, i.e. a reader device, stores an API (Application Program Interface) comprising means for instantiating, initializing, reading, incrementing or decrementing the counter of the cyclic elementary file. The API further includes means or circuitry for comparing the backup value of the counter, which is stored in the backup buffer, with the counter, and means or circuitry for restoring the backup value in the cyclic elementary file CEF, if the counter is different from the backup value.

| Name | Function |
| --- | --- |
| Create_counter | Creates a counter file |
| Initialize_counter | Initializes the counter file |
| Update_counter | Increments or decrements the counter file |
| Is_synchronized | Checks whether the counter files (public and hidden) are synchronized. |
| Read_counter | Read the counter |

The IC Card including the respective cyclic elementary comprises a set of APDU for managing the counter, as reported in the following table. A plurality of APDUs commands to be transmitted between the reader device and the IC Card, responsive to the means or circuitry of the API are defined, including APDUs for instantiating, initializing, reading, incrementing or decrementing the counter. Moreover, an APDU command for comparing the backup value with the counter and an APDU command for restoring the backup value in the cyclic elementary file CEF are provided. The backup value is restored if the counter is different from the backup value.

| Name | Function |
| --- | --- |
| Create_counter_ADPU | Creates a counter file (public or hidden) |
| Initialize_counter_ADPU | Initializes both the counter files (public and hidden) |
| Update_counter_ADPU | Increments or decrements both the counter files (public and hidden) |
| Check_counter_coherence_ADPU | Checks whether the counter files have been coherently updated/initialized. |
| Read_counter_ADPU | Reads the public counter (the newest record) |
| Recover_counter_ADPU | The counter is lead to a coherent value. |

More particularly, the functions "Initialize_ counter_ADPU" and "update_counter_ADPU" may be implemented with a same APDU.

The table below reports an example for the format of a 4-byte counter,

| APDU Byte | Value and Description |
| --- | --- |
| CLA | 00h |
| INS | XXh |
| P1 | XXh |
| P2 | Mode byte: see next table |
| Lc | Number of bytes in the data field. Allowed value are:<br>00h (No amount given)<br>XXh (amount length)<br>YYh (init length counter value) |
| Data Field | Empty<br>XX amount to add or subtract to the counter<br>YY init value |
| Le | Length of expected data out from the card. Possible values are:<br>YYh (current counter length) | and the following table describes an example of a format of the APDU byte P2.

P2 mode byte description

| Bit Number | | | | | | | | Description |
| --- | --- | --- | --- | --- | --- | --- | --- | --- |
| 7 | 6 | 5 | 4 | 3 | 2 | 1 | 0 | |
| — | — | — | — | 0 | 0 | 0 | 1 | Read the counter |
| — | — | — | — | 0 | 0 | 1 | 0 | Increment the counter |
| — | — | — | — | 0 | 1 | 0 | 0 | Decrementthecounter |
| — | — | — | — | 1 | 0 | 0 | 0 | Init counter file |
| x | x | — | x | x | x | x | x | Other RFU |
| — | — | 0 | — | — | — | — | — | Amount received in the data command |
| — | — | 1 | — | — | — | — | — | Amount implicit fixed. |

Advantageously the method of the present invention supports IC Card applications using a counter which is always incremented or always decremented, for a number of times greater than the number of erase operations supported by the memory pages of the IC Card. Advantageously the method further supports IC Card applications requiring a counter which is incremented or decremented, for a number of times greater than the number of erase operations supported by the memory pages of the IC Card.

Advantageously, even if a memory pages supports only m erase operation, N*m erase operations are supported associating N records to N respective memory pages and associating the N records to a cyclic elementary file CEF. Also, even if the memory pages supports only m erase operation, N*Pk*m erase operations are supported associating N records to each memory page and associating the N*k records to a cyclic elementary file CEF.

That which is claimed:

1. A method for executing n data updates in an integrated circuit (IC) for an IC Card comprising a memory having memory pages supporting m erase operations per page, with m being less than n, the method comprising:
   allocating a cyclic elementary file including N records, each record associated with a memory page, the cyclic elementary file indexing a less recently updated record which is erased before data is written to a current record, using a processor of the IC.

2. A method according to claim 1, wherein N is at least n/m.

3. A method according to claim 1, wherein after writing the data to the current record, the cyclic elementary file updates an index to the less recently updated record, cyclically pointing to a following record in the cyclic elementary file with respect to the current record.

4. A method according to claim 1, wherein each record stores a counter which is incremented after the data is written to that record.

5. A method according to claim 4, wherein the cyclic elementary file implements the indexing of the less recently updated record by reading a low value of the counter in the records.

6. A method according to claim 4, further comprising storing an API in a reader device for the IC, the API comprising modules for at least one of instantiating, initializing, reading, incrementing, and decrementing the counter.

7. A method according to claim 6, further comprising storing data to be written to the current record in a backup buffer, and retrieving the data from the backup buffer if a fault occurs before the data is written to the current record; and wherein the API further comprises a module for comparing a backup value of the counter, which is stored in the backup buffer, with the counter, and a module for restoring the backup value in the cyclic elementary file if the counter is different from the backup value of the counter.

8. A method according to claim 6, further comprising defining an application level protocol to be transmitted between the reader device and the IC, responsive to the modules of the API, including at least one command for instantiating, initializing, reading, incrementing and decrementing said counter.

9. A method according to claim 8, further comprising storing data to be written to the current record in a backup buffer, and retrieving the data from the backup buffer if a fault occurs before the data is written to the current record; wherein the API further comprises a module for comparing a backup value of the counter, which is stored in the backup buffer, with the counter, and a module for restoring the backup value in the cyclic elementary file if the counter is different from the backup value of the counter; and further comprising defining an APDU command responsive to the modules of the API for comparing backup value of the counter with the counter, and an APDU command for restoring the backup value of the counter in the cyclic elementary file if the counter is different from the backup value of the counter.

10. A method according to claim 1, wherein each record comprises a counter which is incremented or decremented after the data is written to that record.

11. A method according to claim 10, wherein the cyclic elementary file implements the indexing of the less recently updated record by storing a second counter in the records which is increased after the data is written to the records; and further comprising detecting the record storing a low value of the second counter.

12. A method according to claim 10, wherein the cyclic elementary file implements the indexing of the less recently updated record by associating a status byte with each record, the status byte being set to a first value if the record is unused, to a second value if the record is the current record, and to a third value otherwise; further comprising detecting the record having the status byte with the third the value associated therewith, and indexing a following record in the cyclic elementary file as the less recently updated record.

13. A method according to claim 1, further comprising storing data to be written to the current record in a backup buffer, and retrieving the data from the backup buffer if a fault occurs before the data is written to the current record.

14. A method according to claim 1, wherein data to be updated by a predetermined number of subsequent writings are stored in a plurality of records associated to a same memory page with a predetermined size at least equal to N*r, wherein r is a size of the data to be updated.

15. A method for executing n data updates in an integrated circuit (IC) for an IC Card, the IC comprising a memory having memory pages supporting m erase operations per page, with m being less than n, the method comprising:

allocating a cyclic elementary file including N records, N being at least n/m, each record associated with a memory page, the cyclic elementary file indexing a less recently updated record which is erased before data is written to a current record, using a processor of the IC; and after writing the data to the current record, using the cyclic elementary file to update an index to the less recently updated record, cyclically pointing to a following record in the cyclic elementary file with respect to the current record, using the processor.

16. A method according to claim 15, wherein each record stores a counter which is incremented after the data is written to that record.

17. A method according to claim 16, wherein the cyclic elementary file implements the indexing of the less recently updated record by reading a low value of the counter in the records.

18. A method according to claim 15, wherein each record comprises a counter which is incremented or decremented after the data is written to that record.

19. A method according to claim 18, wherein the cyclic elementary file implements the indexing of the less recently updated record by storing a second counter in the records which is increased after the data is written to the records; and further comprising detecting the record storing a low value of the second counter.

20. An integrated circuit (IC) for an IC card comprising:
a memory configured to store memory pages supporting m erase operations per page, with m being less than n; and
a processor coupled to said memory and configured to allocate a cyclic elementary file including N records, each record associated to a memory page of the IC Card, the cyclic elementary file indexing a less recently updated record which is erased before data is written to a current record.

21. An IC according to claim 20, wherein each record stores a counter which is incremented after the data is written to that record.

22. An IC according to claim 21, wherein the cyclic elementary file implements the indexing of the less recently updated record by reading a low value of the counter in the records.

23. An IC according to claim 20, wherein each record comprises a counter which is incremented or decremented after the data is written to that record.

24. An IC according to claim 23, wherein the cyclic elementary file implements the indexing of the less recently updated record by storing a second counter in the records which is increased after the data is written to the records, and wherein said processor detects the record storing a low value of the second counter.

* * * * *